United States Patent [19]

Caransa et al.

[11] Patent Number: 5,067,982

[45] Date of Patent: Nov. 26, 1991

[54] CORN STEEPING PROCESS AND APPARATUS

[75] Inventors: Abraham Caransa, Uithoorn; Jan van den Dorpel, Bussum, both of Netherlands

[73] Assignee: Dorr-Oliver Incorporated, Milford, Conn.

[21] Appl. No.: 431,124

[22] Filed: Nov. 3, 1989

[51] Int. Cl.$^5$ .......................... C08B 30/04; A23L 1/10
[52] U.S. Cl. ........................................ 127/67; 426/18; 426/463; 426/481; 426/482
[58] Field of Search ....................... 426/67, 68, 65, 18, 426/463, 464, 481, 482

[56] References Cited

U.S. PATENT DOCUMENTS

| | | | |
|---|---|---|---|
| 3,072,501 | 1/1963 | Meisel | 127/67 |
| 4,042,414 | 8/1977 | Goering et al. | 127/68 |
| 4,086,135 | 4/1978 | Balana et al. . | |
| 4,244,748 | 1/1981 | Chwalek et al. | 127/67 |
| 4,412,867 | 11/1983 | Cicuttini | 127/67 |

Primary Examiner—Theodore Morris
Assistant Examiner—P. L. Hailey
Attorney, Agent, or Firm—Harold M. Snyder

[57] ABSTRACT

A corn steeping process is conducted in a fluidized bed apparatus with steeping liquor introduced at the bottom of the apparatus and removed from the top of the apparatus after traversing the body of fluidized corn grains.

13 Claims, No Drawings

CORN STEEPING PROCESS AND APPARATUS

BACKGROUND OF THE INVENTION

A corn steeping process as well as a process and apparatus for processing corn.

This invention relates to a corn steeping process wherein corn grains in one or more vessels are contacted with sulphur dioxide containing steeping liquid at a temperature of from 40° to 55° C. In the manufacture of corn starch, it is customary to subject fresh purified corn grains to a prolonged steeping treatment in an aqueous solution of sulphur dioxide and/or lactic acid in order to prepare these grains for subsequent milling and starch separating operations. During such steeping treatment, the aqueous solution extracts soluble substances from the corn kernels. The resulting steep liquor may be used as a nutrient medium for microbiological fermentations or in concentrated form as a component of cattle feed.

The steeping treatment is usually effected in vertical reaction vessels by filling these vessels with a batch of corn, adding an amount of steeping liquor and applying steam to maintain the temperature at about 50° C. After completion of the treatment the liquor is drained off and the corn is removed from the vessel and fed to a milling station.

In practice, a number of reaction vessels, e.g. six to ten or more are positioned next to each other and are filled one after the other with a batch or corn. In this way, the corn in the first filled vessel has undergone already a relatively long steeping treatment at the time of filling the last. The steeping liquor is passed then through all these vessels in series, first entering the vessel in which the corn has already undergone a long steeping treatment, them passing to a vessel in which the corn has undergone a shorter steeping treatment etc., and finally entering the vessel filled with fresh corn.

In each of these vessels, the steeping liquor will extract soluble substances from the corn so that it will grow gradually more concentrated in soluble components.

Thus, whereas the corn wet milling process following the steeping process is a continuous process, the steeping is static, semicontinuous and therefore time consuming and inefficient. The steeping time varies from 32 to 60 hours depending upon the corn quality.

In the current conventional steeping-system the liquid flow is from top to bottom. The corn sits in the vessels and each kernel is more than 65% covered by other corn kernels. All corn grains remain stationary during the whole steeping treatment which will increase the irregularity of the liquor flow around the corn kernels. During the steeping treatment the kernels swell by absorption of water. However, in a large steep vessel corn does not appear to increase in volume because the weight of grain forces the swelling kernels to reorient to fill the irregular voids between the kernels. When said voids become smaller, the velocity of the liquid around the kernels decreases even more and so does the mass transfer. Therefore, the efficiency of steeping treatment decreases in time.

Many efforts have been carried out to reduce the steeping time. Kempf, Die Starke, 23 (1971) Nr. 3, pages 89–95, mentions that in laboratory tests it has been found that using a mechanical movement of corn in comparison with the conventional corn steeping process equal starch yields may be obtained at a shortened steeping time of about 30 hours maintaining equal quality properties of the obtained starch. However, the quantitative and qualitative results are only comparable with those obtained after conventional steeping at marginally reduced steeping times.

Hassanean, Die Starke, 38 (1968) Nr. 12, pages 417–419, steeped corn grains by using two methods in laboratory. The first method was the usual counter-current system for 50 hours as a control. The second method was the counter-current system with agitation at low speed (150 r.p.m.) for 10 hours. The steeping agent in the first 5 hours was a used sulphurous acid solution and in the second 5 hours a fresh $SO_2$ solution.

The results show that the moisture and protein contents of intact grains after both steeping treatments are equal and also the starch yields are quite similar. However, changing the steeping liquor will cause problems when applied on industrial scale. Further, in this article it is reported that in a plant the steeping time could be reduced to 25 hours by using the counter-current system with circulation of corn grains and corn steepwater.

The agitation and mechanical movement proposed in the above prior art are highly energy and maintenance intensive and difficult to carry out on full scale industrial applications. The object of this invention is to provide a corn steeping process which can be carried out in a short period without technical difficulties.

SUMMARY OF THE INVENTION

The invention provides for a corn steeping process as defined in the preamble, characterized in that the steeping is carried out in a fluidized bed formed from corn grains and steeping liquid. The fluidization is found to offer an improvement in mass transfer resulting in a steeping time reduced to only 12 hours. As in the prior art the process according to the invention can be carried out in one vessel, wherein the steeping liquid is recycled through the vessel by continuously discharging said liquid at the top of the vessel and feeding the liquid at the bottom of the vessel.

Alternatively, the process according to the invention can be carried out in a number of reaction vessels in series, wherein the steeping liquid is passed through the vessels in counter-current by continuously discharging said liquid at the top of a vessel and feeding the liquid at the bottom of a subsequent vessel.

DETAILED DESCRIPTION

In order to obtain a good fluidization a minimum fluidization velocity of $20.10^{-3}$ m.s.$^{-1}$ is necessary. Preferably the fluidization velocity is from $20.10^{-3}$ to $100.10^{-3}$ m.s.$^{-1}$, especially $60.10^{-3}$ m.s.$^{-1}$. Alternatively, the fluidization conditions may be expressed as flow percentage per time unit of the available steeping liquid.

This flow percentage may vary from 10 to 100% per hour. Optimal results in the lab have been obtained using a flow of 12% per hour, the other variables of the steeping process being those of the prior art, i.e. a temperature of 50° C. and a $SO_2$ content of 0.2%. Using the above conditions the steeping time could be reduced to 12 hours, i.e. 25% of the steeping time under conventional conditions, under maintenance of:

moisture absorption of the corn, separability in various components (fibers, germs, gluten and starch) according to the known Pelshenke and Lindemann method, quality of the various products.

Exerting pressure appeared to have no effect on the process of the invention. Therefore, the process preferably is carried out under atmospheric pressure.

Adding corn components degrading enzymes to the steeping liquid indeed appeared to have a favorable effect. The above mentioned enzymes are in particular phytin degrading enzymes and cellulases.

Based on lab experiments it is expected that when treating U.S. Yellow Nr. 2 corn or similar, less than one year old and/or when adding phytin degrading or other enzymes to the steeping liquid a steeping time of 8 to 10 hours or less will be adequate.

The invention further provides a process for processing corn comprising the consecutive steps of
a) Steeping corn grains in warm water containing sulphur dioxide in a fluidized bed formed from corn grains and steeping liquid,
b) separating the steep water from the grains and concentrating it,
c) milling the grains coarsely and separating and dewatering germs,
d) fine-milling the grains, separating fibers from starch and protein, and dewatering the fiber fractions, and
e) separating starch and protein from each other, concentrating the protein fraction and drying and/or converting the starch fraction.

Further, the invention provides for an apparatus for processing corn essentially comprising a steeping device comprising a reaction vessel or a number of reaction vessels connected in series, said steeping device being connected to separators for the various corn fractions such as fibers, starch and protein, characterized in that the vessel(s) is(are) fluidized bed reactors.

The preferred embodiment for performing Fluidized Bed Steeping (F.B.S.) is a cylindrical vessel comprising three sections, being:

the lower section having a conical shape and equipped with provisions for distributing the liquid flow evenly over the cross-sectional area the middle section which holds the fluidized bed of corn kernels and equipped with provisions to prevent the corn kernels from entering the upper section the upper section for discharging the steeping liquid.

The unsteeped corn will be fed to the middle section, from which section also the steeped corn will be discharged.

EXAMPLE

In this example French South-West corn was used having a bulk 1 weight of 763 g.l.$^{-1}$, and a moisture content of 12.95%. The analytical composition in percentage dry substance is: starch 71.13%, protein 9.67%, fat 4.82%, mineral ash 1.27% and solubles 4.23%.

On a laboratory scale two tests were carried out:
A. 48 hours of conventional steeping
B. 12 hours of steeping in a fluidized bed having a flow of 12% per hour.

After steeping the corn grains were further processed according to the standard Pelshenke and Lindemann method.

The SO$_2$ content in both tests was 0.2%.

The temperature in test A was 50° C. and in test B 47° to 49° C.

The results are shown in the following Table.

TABLE

| Test | Yield in % of Dry Weight | |
|---|---|---|
| | A | B |
| Steepwater dry substance | 4.47 | 4.94 |
| Germs (fat content) | 7.79 (43.96) | 7.90 (44.27) |
| Fibers (B starch content) | 10.42 (16.36) | 10.12 (15.14) |
| Starch (protein content) | 66.88 (0.83) | 66.08 (1.10) |
| Gluten (protein content) | 7.10 (51.49) | 8.95 (49.13) |
| Supernatant dry substance | 2.78 | 1.78 |
| Total dry substance | 99.45 | 99.77 |
| Starch recovery | 94.0 | 92.9 |
| Moisture content after Steeping | 43.26 | 40.78 |

As appears from the Table the values obtained by using the conventional process and by using the process of the invention, are very close to each other.

We claim:

1. A corn steeping process wherein corn grains in one or more vessels are contacted with sulphur dioxide containing steeping liquid at a temperature of from 40° to 55° C., characterized in that the steeping is performed in a fluidized bed formed from corn grains and the steeping liquid.

2. A corn steeping process according to claim 1, characterized in that the corn is steeped in one vessel wherein said steeping liquid is recycled through the vessel by continuously discharging said liquid at the top of the vessel and feeding the liquid at the bottom of the vessel.

3. A corn steeping process according to claim 1, characterized in that the corn is steeped in a number of vessels in series wherein the steeping liquid is passed through the vessels in counter-current by continuously discharging said liquid at the top of a vessel and feeding the liquid at the bottom of a subsequent vessel.

4. A corn steeping process according to claim 2 or 3 characterized in that the fluidization velocity is from 20.10$^{-3}$ to 100.10$^{-3}$ m.s.$^{-1}$.

5. A corn steeping process according to claim 4, characterized in that said steeping liquid contains one or more corn component-degrading enzymes.

6. A corn steeping process according to claim 4 characterized in that the steeping liquid contains one or more phytin degrading enzymes and/or cellulases.

7. A corn steeping process according to claim 4 characterized in that the steeping is performed under atmospheric pressure.

8. A corn steeping process according to claim 4 characterized in that the steeping is conducted for from 8 to 20 hours.

9. A corn steeping process according to claim 6 characterized in that the steeping is performed under atmospheric pressure.

10. A corn steeping process according to claim 6 characterized in that the steeping is conducted for from 8 to 20 hours.

11. A corn steeping process according to claim 7 characterized in that the steeping is conducted for from 8 to 20 hours.

12. A corn steeping process wherein corn grains are steeped in a plurality of vessels arranged in series, providing steeping liquid at a temperature of from 40° to 55° C., passing said liquid through said vessels in counter-current, discharging said liquid at the top of a vessel and feeding the liquid at the bottom of a subsequent vessel, introducing the liquid at the bottom of a vessel at a velocity of from $20.10^{-3}$ to $100.10^{-3}$ m.s.$^{-1}$ thereby establishing within a vessel a fluidized bed of corn grains in which processing time is substantially decreased.

13. A corn steeping process in accordance with claim 12 characterized in that said steeping liquid contains one or more phytin degrading enxymes and/or cellulases.

* * * * *